(No Model.)
W. E. KARNS.
REVERSING LINK FOR ENGINES.
No. 292,018. Patented Jan. 15, 1884.
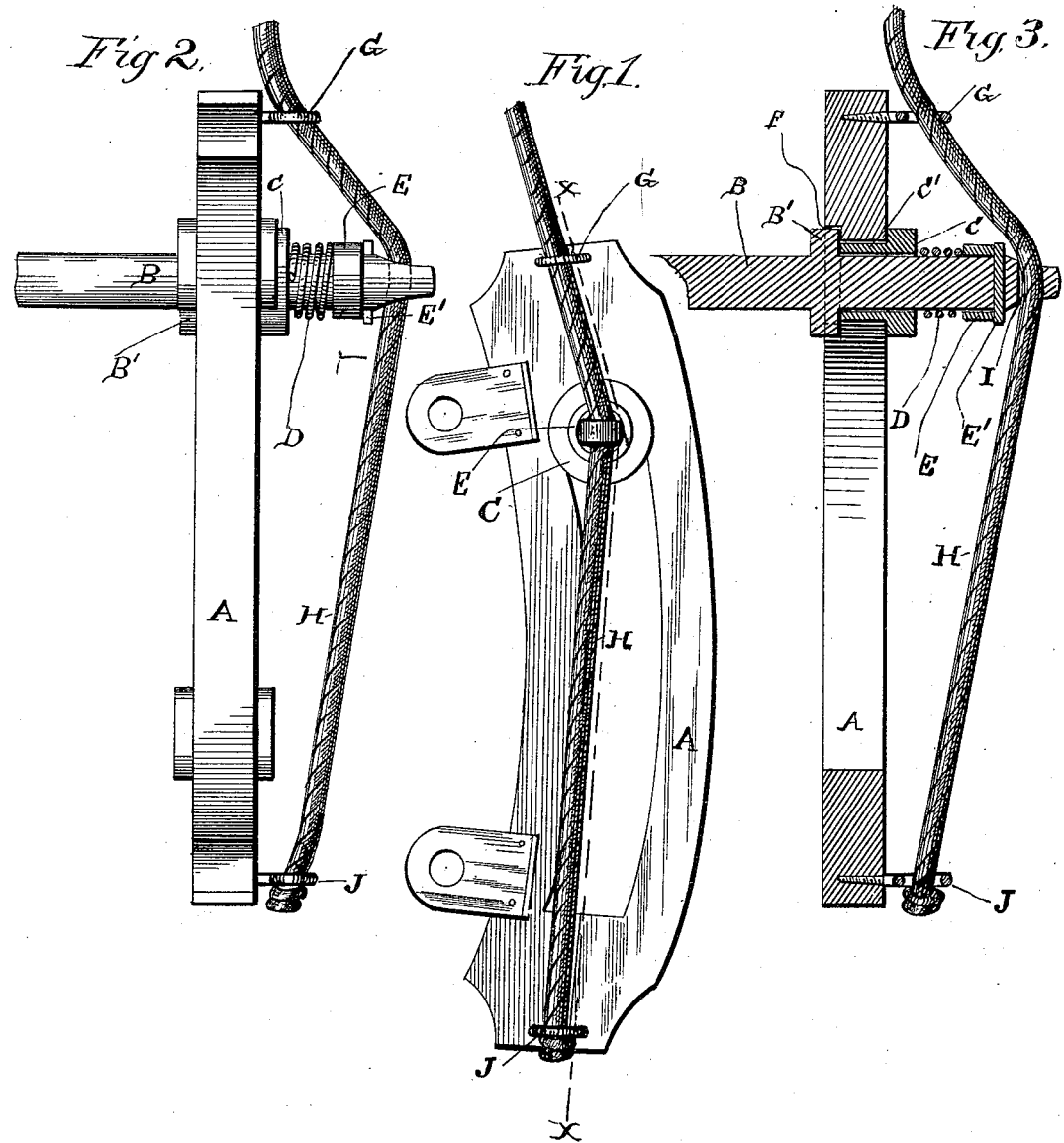

UNITED STATES PATENT OFFICE.

WILLIAM ELLIOTT KARNS, OF PARKER'S LANDING, PENNSYLVANIA.

REVERSING-LINK FOR ENGINES.

SPECIFICATION forming part of Letters Patent No. 292,018, dated January 15, 1884.

Application filed September 28, 1883. (No model.)

*To all whom it may concern:*

Be it known that I, WILLIAM E. KARNS, of Parker's Landing, in the county of Armstrong and State of Pennsylvania, have invented certain new and useful Improvements in Reversing-Links for Steam-Engines; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved reversing-link for steam-engines. Fig. 2 is an edge view of the same, and Fig. 3 is a longitudinal sectional view on line x x, Fig. 1.

Similar letters of reference indicate corresponding parts in all the figures.

My invention has relation to reversing-links for steam-engines; and it consists in the improved construction and combination of parts of the same, as will be hereinafter more fully described and claimed.

In the accompanying drawings, A represents the link, which is constructed substantially in the manner and shape ordinarily employed.

B represents the link-pin, which is provided with an annular flange or projection, B', and upon which the reversing-link slides. A flanged collar or sleeve, C, the flange C' of which bears against the side of the link, works upon the pin B, and is held in operative position by a spiral spring, D, secured upon the pin B between the flanged end of the sleeve C and a washer, E, prevented from slipping off the link-pin by a pin, E'. The link A is provided at its upper end with a countersunk recess, F, adapted to receive the collar B' of the link-pin B, and thereby lock the link in its normal position. To the lower end of the link is secured an eyebolt, G, to which one end of the operating-cord H is attached, the said cord passing up through an aperture, I, in the end of the link-pin B, then through an eyebolt, J, secured at the top of the link, the cord H passing over a pulley and running off to any desired distance.

The manner in which my improved reversing-link for steam-engines is operated is as follows: When the link is in its lower or normal position, the coiled spring D holds the link with the collar B fitting within the countersunk recess F, thereby locking the link firmly in its normal position, and preventing it from being shaken out of the same through any sudden jar of the locomotive or ship upon which the engine is stationed. When it is desired to raise the link for the purpose of reversing the engine, the operator pulls upon the free end of the cord H, thereby drawing the link away from the collar B' of the link-pin B until the said collar is freed from the countersunk recess F, and the space between the collar B' and the flange C' of the sleeve C is equal to the width of the link, when the link may readily be raised, the free end of the cord being then secured to a suitable pin to hold the link in its raised position. To restore the link to its normal position the operator slackens the cord H, when the link will drop of its own weight into its normal position, and, the countersunk recess F coming opposite to or registering with the link-pin B, the pressure of the spring D will force the collar B' of the pin B into the recess F, thereby firmly locking the link in its normal position, and, as before stated, preventing it from being shaken out of that position even in the least degree by any sudden jar of the train or vessel carrying the engine.

From the foregoing description, taken in connection with the accompanying drawings, the construction and operation of my improved reversing-link for steam-engines will readily be understood without requiring further explanation.

Having thus described my invention, I claim and desire to secure by Letters Patent of the United States—

In a reversing-link for steam-engines of substantially the described construction, the combination of the link A, having the countersunk recess F, and eyebolts G J, link-pin B, having aperture I and collar B', adapted to fit within the countersunk recess F, and provided with the sliding sleeve C, having flange C', spiral spring D, and washer E, with the operating-cord H, all constructed and arranged to operate substantially in the manner and for the purpose shown and described.

In testimony that I claim the foregoing as my own I have hereunto affixed my signature in presence of two witnesses.

WILLIAM ELLIOTT KARNS.

Witnesses:
 WILLIAM ELLOT COOPER,
 SAML. A. HUGHES.